United States Patent
Qiao

(10) Patent No.: US 8,078,429 B2
(45) Date of Patent: Dec. 13, 2011

(54) DIAGNOSIS AGENT FOR REMOTE PLANT DIAGNOSIS

(75) Inventor: Liu Qiao, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 320 days.

(21) Appl. No.: 12/394,227

(22) Filed: Feb. 27, 2009

(65) Prior Publication Data

US 2010/0223028 A1   Sep. 2, 2010

(51) Int. Cl.
   *G06F 15/00* (2006.01)
(52) U.S. Cl. ............... 702/183; 702/33; 702/34; 702/35; 702/58; 702/59; 702/104; 702/113; 702/177; 702/182; 73/658; 73/660; 324/555; 714/25; 700/29; 700/30; 700/31; 701/40; 701/59; 345/595; 345/621
(58) Field of Classification Search ............... 702/33–35, 702/58–59, 104, 113, 177, 182–183; 73/658, 73/660; 324/555; 714/25; 700/29–31; 701/40, 701/59; 345/595, 621
See application file for complete search history.

(56) References Cited

U.S. PATENT DOCUMENTS

| 6,411,678 | B1 | 6/2002 | Tomlinson, Jr. et al. |
| 6,950,782 | B2 | 9/2005 | Qiao et al. |
| 2009/0204232 | A1* | 8/2009 | Guru et al. .................. 700/9 |

FOREIGN PATENT DOCUMENTS

EP   1089493   4/2001

OTHER PUBLICATIONS

Jianhui Luo et al.; Agent-Based Real-Time Fault Diagnosis; IEEEAC Paper #1574; 2005.

* cited by examiner

*Primary Examiner* — Sujoy Kundu
(74) *Attorney, Agent, or Firm* — Gifford, Krass, Sprinkle, Anderson & Citkowski, P.C.

(57) ABSTRACT

The present invention discloses a plant diagnostic system for diagnosing a problem with the plant. The plant diagnostic system can include an agent-based plant diagnostic network that has an adaptive global agent located in a central facility, a plant expert agent located at the plant and a plurality of subsystem resident agents. Each of the subsystem resident agents can be assigned to a subsystem of the plant. A diagnosis agent can also be included, the diagnosis agent operable to be instructed by the adaptive global agent, transmitted to the plant expert agent, be received by the plant expert agent, transmitted by the plant expert agent back to the adaptive global agent and be received by the adaptive global agent.

10 Claims, 7 Drawing Sheets

DIAGNOSIS AGENT FOR REMOTE PLANT DIAGNOSIS

FIELD OF THE INVENTION

The present invention is related to diagnosis of a problem within a plant. In particular, the present invention is related to a diagnosis agent for use in diagnosing a problem in a plant from a remote location.

BACKGROUND OF THE INVENTION

Many plants, also known as machines, have systems that provide the capability for diagnosing a problem therewithin. Such diagnostic systems can typically monitor various plant operations and collect data related thereto. The data can then be analyzed in order to determine whether or not a component performing a plant operation is functioning within predefined tolerance limits, should be replaced, etc.

One such type of plant can be a motor vehicle. Modern motor vehicles are becoming ever more complex and are requiring improved diagnostic systems. In particular, heretofore global diagnosis methods, i.e. diagnosis methods that collect diagnostic information from all of the subsystem electronic control units and analyze the information at a central location, are becoming more and more unpractical due to high communication requirements and time delays that result from a centralized diagnosis.

In response to inefficient global diagnosis methods, agent-based distributed diagnosis architectures have been developed where each subsystem of the motor vehicle can have a subsystem resident agent embedded within the subsystem electronic control unit, the subsystem resident agent operable to perform its own fault inference and communicate the diagnostic results to a vehicle expert agent. The vehicle expert agent can perform cross-subsystem diagnosis and resolve conflicts between subsystem resident agents. In addition, the vehicle expert agent can provide an accurate vehicle-level diagnostic inference.

However, it is appreciated that such agent-based distributed diagnosis architectures can be expensive and relatively inflexible with respect to new diagnosis architecture that may become available after the motor vehicle has been introduced to the market. As such, a distributed diagnosis agent architecture and/or more effective/efficient algorithm that is simplified with respect to current architectures and has no impact on existing plant electronic control unit hardware and little or no impact on existing plant electronic control unit structure would be desirable.

SUMMARY OF THE INVENTION

The present invention discloses a plant diagnostic system for diagnosing a problem with a plant. The plant can have a plurality of subsystems, each of the plurality of subsystems having one or more components that participate in the operation of the plant by performing one or more plant operations. In addition, each of the plurality of subsystems can have one or more sensors that detect the one or more plant operations and transmit data related thereto.

The plant diagnostic system can include an agent-based plant diagnostic network that has an adaptive global agent located in a central facility, a plant expert agent located at the plant and a plurality of subsystem resident agents. Each of the subsystem resident agents can be assigned to one of the plurality of subsystems of the plant. A diagnosis agent can also be included, the diagnosis agent operable to be: (1) instructed by the adaptive global agent; (2) transmitted to the plant expert agent; (3) received by the plant expert agent; (4) transmitted by the plant expert agent back to the adaptive global agent; and (5) received by the adaptive global agent. The plant expert agent can receive the diagnosis agent transmitted from the adaptive global agent and transmit an instruction from the diagnosis agent to at least one of the plurality of subsystem resident agents. It is appreciated that the subsystem resident agent can perform a task based on the instruction from the diagnosis agent and subsequently send information from the completed task to the plant expert agent. The plant expert agent can then exchange the information with the diagnosis agent and transmit the diagnosis agent back to the adaptive global agent. In some instances, the task can be an unstructured task that affords for new diagnosis instructions to be sent by the adaptive global agent to the plant expert agent and performed thereby after the plant has been placed in service.

The plant expert agent can perform the unstructured task and obtain a result, said result provided to the diagnosis agent. The diagnosis agent with the result can then be returned to the adaptive global agent. The result can be data from one or more of the sensors of the plant and may or may not include a fault code assigned to one of the components of the plant. In addition, the result can be a diagnostic analysis performed by the plant expert agent on at least one of the plurality of subsystems of the plant. The adaptive global agent, upon receiving the result from the diagnosis agents that has been transmitted thereto, can re-instruct the diagnosis agent and transmit it back to the plant. It is appreciated that the re-instructions can be used to obtain additional information, data, and the like from the plant expert agent, one or more of the subsystem resident agents, one or more of the components of the subsystems of the plant and the like.

DETAILED DESCRIPTION OF THE INVENTION

Figure 1:
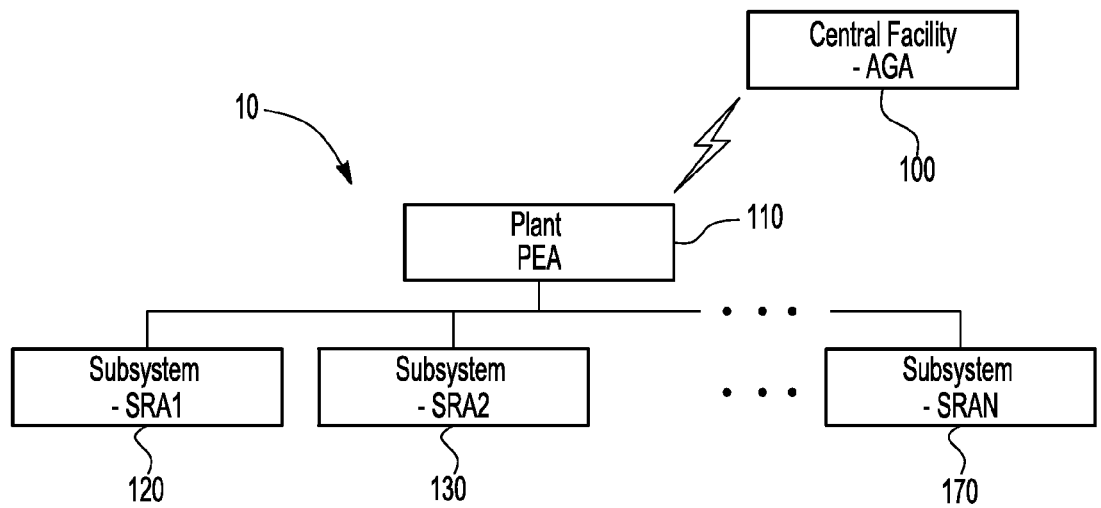
FIG. 1 is a schematic diagram illustrating a central facility in communication with a plant having a plurality of subsystems.

The present invention discloses a plant diagnostic system for diagnosing a problem with a plant. As such, the system has utility for aiding problem diagnosis.

The plant diagnostic system can be used for diagnosing the problem from a remote location. The plant can be any kind of plant that has a plurality of subsystems, each of the subsystems having one or more components that participate in the operation of the plant by performing one or more plant operations. Each of the plurality of subsystems can also have one or more sensors that can detect the one or more plant operations and transmit data related thereto. Such a plant can be a motor vehicle, paper making machine, heavy equipment machinery, and the like. In addition, the plant diagnostic system can be used to effectively/efficiently identify multiple faults and/or single faults that trigger or generate multiple trouble codes among the plurality of subsystems.

The system can include an agent-based plant diagnostic network that has an adaptive global agent (AGA) located in a central facility and a plant expert agent (PEA) located at the plant. The agent-based plant diagnostic network can also include a subsystem resident agent (SRA), and in some instances includes a plurality of SRAs. Each of the SRAs can be assigned to one of the plurality of subsystems of the plant. A diagnosis agent (DA) can also be included, the DA operable to at least be instructed by the AGA, sent to the PEA, deliver an instruction to the PEA, receive a result from the PEA and be transmitted back to the AGA. In addition, the PEA can be operable to receive the DA transmitted from the AGA, transmit the instruction from the DA to at least one of the plurality of SRAs, receive information back from the at least one of the plurality of SRAs and exchange the information with the DA. The PEA can be operable to transmit the DA back to the AGA. It is appreciated that the SRAs can perform a task based on the instruction from the PEA, for example and for illustrative purposes only, collect data from one or more of the sensors within the subsystem, perform a diagnostic analysis of the subsystem and the like.

The task can be an unstructured task, the term unstructured task defined as meaning an instruction, task and the like that is not one of the predefined tasks already defined or coded within the PEA and/or one of the SRAs. In this manner, new instructions or tasks can be delivered to the PEA and assist in the diagnosis of a problem therewithin after the plant has been introduced into the market, put into service, etc. In some instances, the PEA and/or one or more of the SRAs performs the unstructured task and obtains a result. Thereafter, the DA can obtain the result from the PEA and return to the AGA with the result.

The result can be in the form of data from one of the plant sensors, a fault code assigned to one of the components of the plant, a diagnostic analysis performed by the PEA on at least one of the subsystems of the plant and the like. Once the DA has returned to the AGA at the central facility, the AGA and/or an individual at the central facility can re-instruct the DA and transmit it back to the PEA. In this manner, the plant diagnostic system affords for enhanced diagnostic capabilities for diagnosing a problem within the plant.

A process for diagnosing the problem in the plant is also disclosed, the process including providing the multi-agent network and the DA. Thereafter, the DA can be instructed to have the PEA perform an unstructured task and the DA is transmitted from the central facility to the PEA. When the DA arrives at the PEA, the PEA can be instructed by the DA to perform the unstructured task and obtain a result. The PEA can perform the unstructured task, obtain a result and thereafter report the result to the DA. The DA can then be transmitted back to the AGA at the central facility where a problem for the plant can be diagnosed. In addition, a problem not currently known by the central facility can be reported to the AGA by the DA.

Turning now to FIG. 1, a schematic diagram of a central facility in communication with a plant is shown generally at reference numeral 10. As shown in this figure, a central facility 100 can have an AGA and be in communication with a plant 110 having a PEA. It is appreciated that the communication between the central facility 100 and the plant 110 can be by wireless communication, wired communication and the like. The plant 110 can have a plurality of subsystems as illustrated by Subsystem1 120, Subsystem2 130, . . . SubsystemN 170. Each of the subsystems can optionally have an SRA as shown in the figure.

Figure 2:
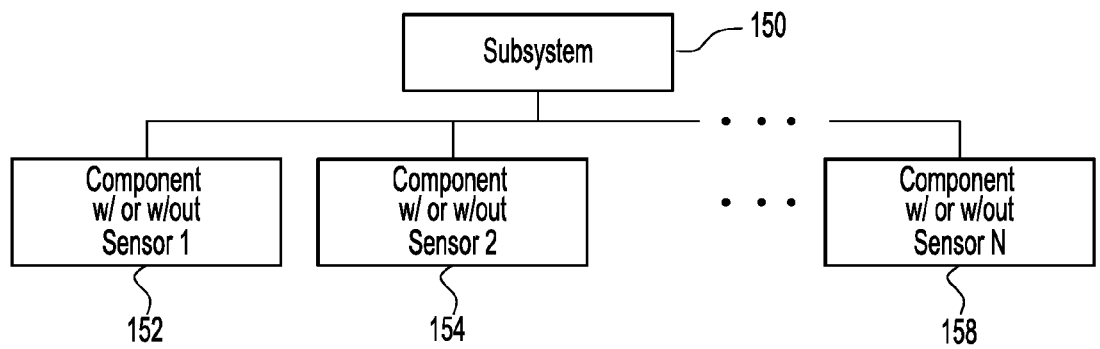
FIG. 2 is a schematic diagram of a subsystem having a plurality of components.

Turning now to FIG. 2, a more detailed illustration of a given Subsystem 150 is shown. The Subsystem 150 can be characteristic of a typical subsystem and have one or more components. In particular, the Subsystem 150 can have a first component with or without a first sensor 152, a second component with or without a second sensor 154 and the like, sensor N 158. As such, it is appreciated that the subsystems shown in FIG. 1 can each have a plurality of components with or without sensors as illustrated in FIG. 2.

Figure 3:
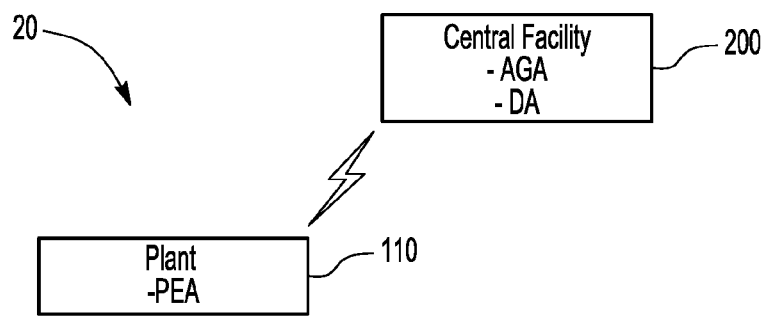
FIG. 3 is a schematic diagram of an embodiment of the present invention.

FIG. 3 illustrates an embodiment of a plant diagnostic system 20 where the plant 110 has a plurality of subsystems as illustrated in FIG. 1. In addition, the plurality of subsystems can each have a plurality of components as illustrated in FIG. 2. In contrast to the central facility 100 shown in FIG. 1, the embodiment shown in FIG. 3 illustrates a central facility 200 that has the AGA and a DA. The DA can be coded or instructed at the central facility 200 and transmitted to the plant 110. The instructed DA can be instructed to direct the PEA to perform one or more tasks. The PEA can instruct one or more of the SRAs to perform the one or more tasks. For example and for illustrative purposes only, the PEA can instruct one or more of the SRAs to collect data from one or more of the components and/or sensors within a given subsystem, request additional data from one or more of the components and/or sensors from a given subsystem, run a test on one or more of the components and/or sensors of a given subsystem, perform a diagnostic analysis of a given subsystem, and the like.

It is appreciated that one or more of the tasks can be an unstructured task. The unstructured task can provide flexibility to diagnose problems within the plant under unstructured/unexpected conditions and situations. In addition, the flexibility allows for the capability to perform new diagnosis of a problem within the plant after the plant has been introduced to the market, put into service, etc.

Figure 4:
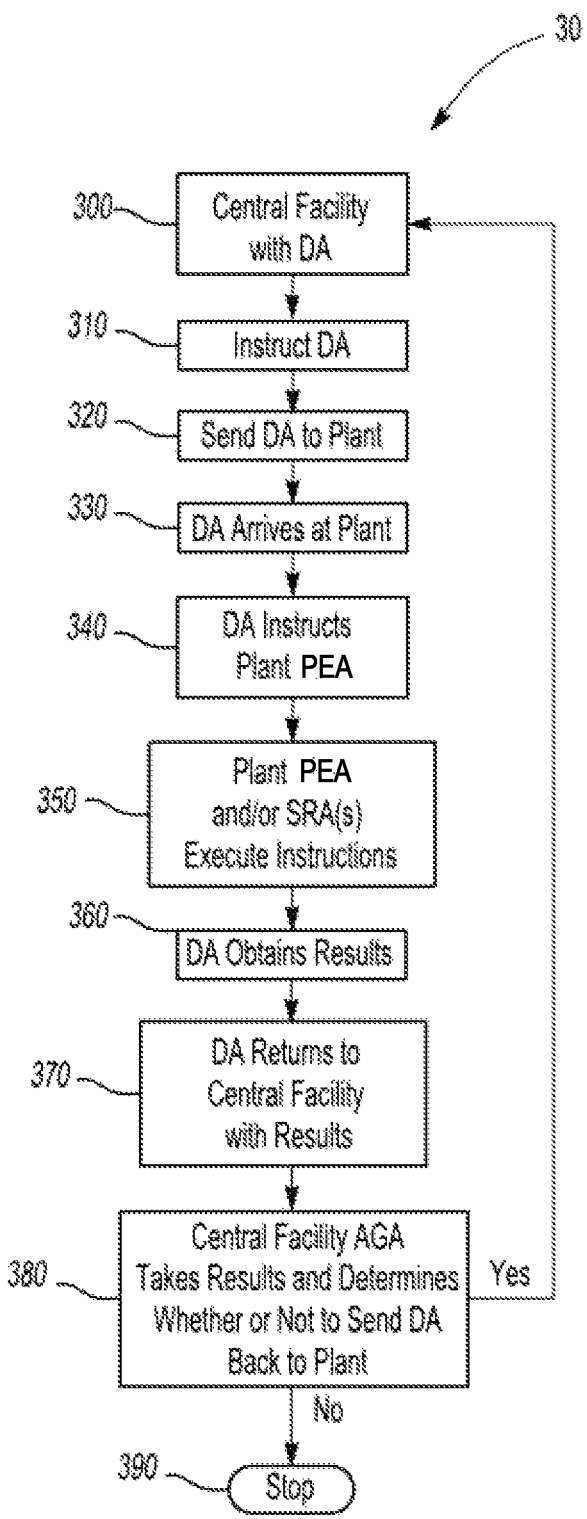
FIG. 4 is a schematic diagram of a process using an embodiment of the present invention.

Turning now to FIG. 4, a schematic diagram illustrating a process for diagnosing a problem in a plant is shown generally at reference numeral 30. The process 30 can include providing a central facility with a DA at step 300. The DA can be instructed at step 310 and sent to a plant at step 320. The DA can arrive at the plant at step 330 and instruct the plant PEA at step 340. The plant PEA and/or one or more of the SRAs can execute an instruction received from the DA at step 350. Thereafter, the DA obtain one or more results from the PEA and/or one or more of the SRAs at step 360 and return to the central facility with the result(s) at step 370. At step 380, the central facility and/or the AGA can take the one or more results from the DA and determine whether or not to send the DA back to the plant. If more data and/or results are desired from the plant, the process returns back to step 300. In the alternative, if the problem has been properly diagnosed and/or no further data and/or results can be obtained from the plant, the process stops at step 390.

Figure 5:
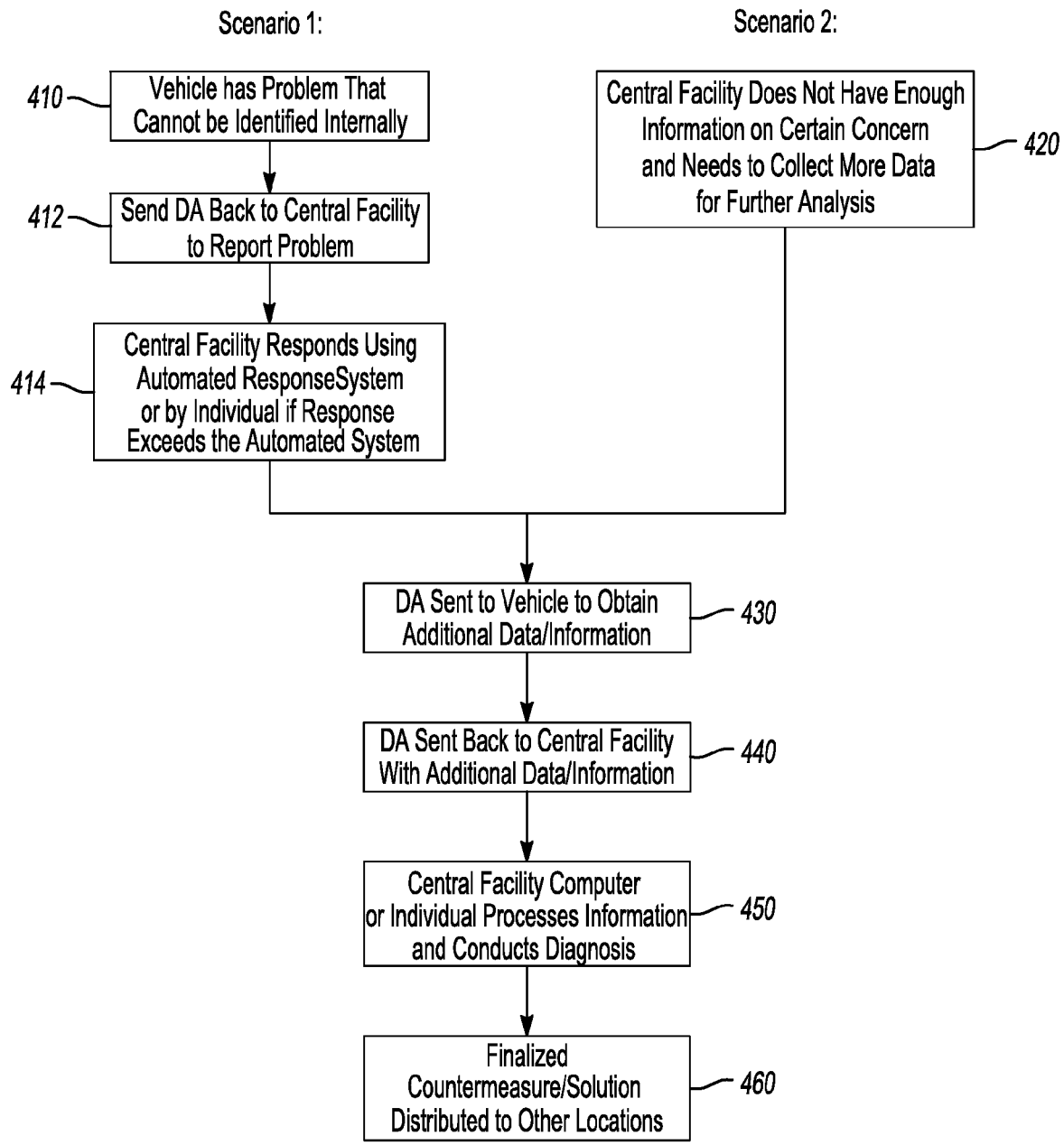
FIG. 5 is a schematic diagram of two scenarios for which a diagnosis agent can be used.

The DA can have at least two scenarios in which it is used as illustrated in FIG. 5. In a first scenario, a motor vehicle can have a problem which it cannot self diagnose as shown at 410. Thereafter, the DA can be sent back to a central facility or diagnosis center in order to report the problem as shown at step 412 and the central facility can generate a response using an automated response system or by an individual if the response exceeds the capability of the automated response system at step 414. The response can be incorporated within the DA and sent to the vehicle to obtain extra data and/or information as shown at step 430. The agent can then be returned to the central facility at step 440 and diagnosis conducted on data received therefrom by the automated response system and/or individual at step 450. Thereafter, and assuming a countermeasure or solution to the initial problem is obtained, the solution can be distributed to other locations such as vehicle dealers, maintenance shops and the like for field repair as shown at step 460.

A second scenario shown at step 420 includes the central facility or diagnosis center not having enough information on a certain concern or problem and thus having a need to collect more data for further analysis. In this instance, the DA can be sent to the vehicle with an instruction to obtain extra data and/or information at step 430 and followed by steps 440-460 as with the first scenario.

Figure 6:
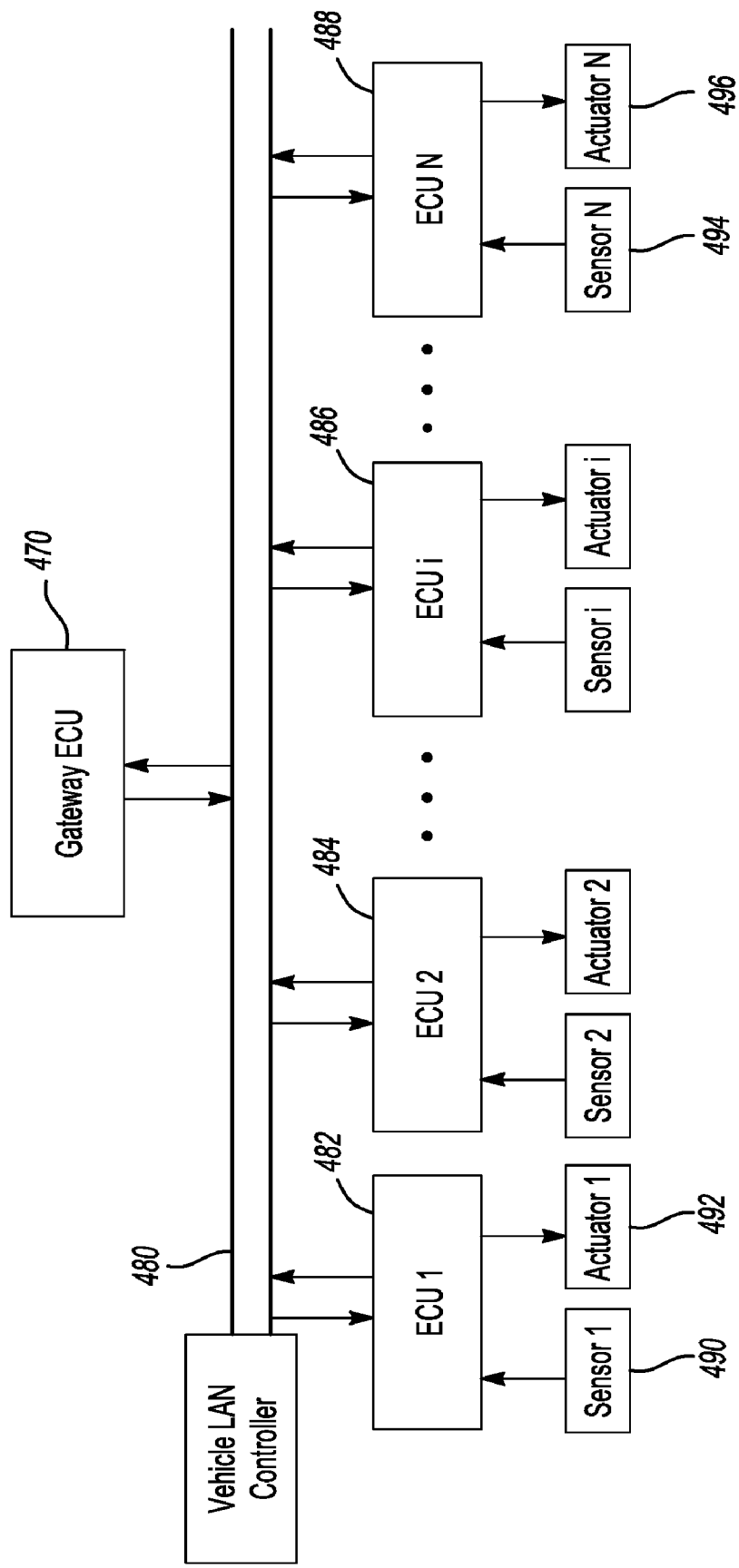
FIG. 6 is a schematic diagram of various electronic control units for a motor vehicle.

The vehicle can have an electronic control unit structure as illustrated in FIG. 6 where a gateway ECU shown at 470 can be in communication with an ECU 1 at 482, an ECU 2 at 484, . . . up to an ECU N at 488. It is appreciated that the gateway ECU at 470 can be in communication with the lower ECUs using a network. In some instances, a local area network (LAN) 480 can be used or in the alternative, a network such as a controlled area network and the like can be used. It is appreciated that each ECU below the gateway ECU 470 can be assigned to a given subsystem of the vehicle. As such, each of the lower ECUs can have a sensor and an actuator. For example, ECU 1 482 can have a sensor 1 at 490, an actuator 1 at 492, etc. In addition, ECU 1 482, ECU 2 484, . . . ECU N 488 can each have more than one sensor and/or more than one actuator.

Figure 7:
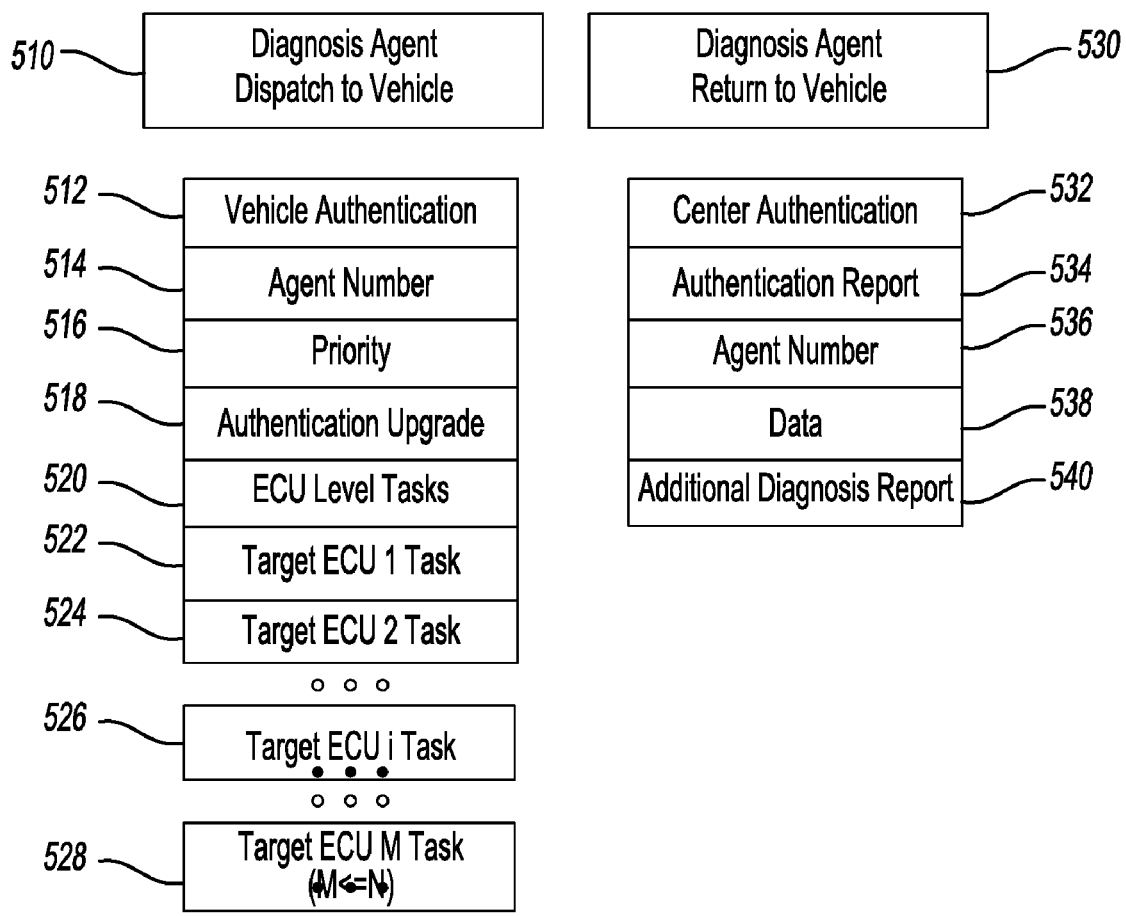
FIG. 7 is a schematic diagram illustrating possible information contained within a diagnosis agent.

For example and for illustrative purposes only, a possible structure for a DA is illustrated in FIG. 7. When the DA is dispatched to the vehicle as shown at 510, the diagnosis agent can include a vehicle authentication 512, an agent number 514, a priority 516, an authentication upgrade 518, an ECU level task 520, and a series of target ECU tasks 522-528. The vehicle authentication 512 can include two levels—a first level that allows general access and seeks to obtain permission to access the vehicle gateway ECU 470 and a second level which can be a higher level access. The higher level access can include a vehicle pulse matching mechanism, such as a mechanism using a dynamic security token concept, which allows for control functions to be accepted by the gateway ECU 470 and/or one or more of the lower ECUs 482, 484, . . . 488.

The agent number 514 can be a unique number for each diagnosis agent. In some instances, the agent number 514 of the DA dispatched to a vehicle can match the agent number of the DA returned to the central facility. The priority 516 can also have more than one level, for example a highest level, a second highest level, third highest level, and a lowest level. In addition, the levels can be associated with the urgency of a given task that is desired to be performed. The authentication upgrade 518 can update security for the vehicle and the ECU level task 520 can coordinate the target ECU tasks with respect to timing coordination and the like. It is appreciated that each of the target ECU tasks 522-528 can conduct data, information, condition and/or test data collection which may or may not include data from active testing under appropriate conditions.

When the diagnosis agent is dispatched back to the central facility as shown at 530, the diagnosis agent can have a central facility authentication 532, an authentication report 534, a agent number 536, data 538 and one or more additional diagnosis reports 540. With respect to the authentication report 534, all unauthorized and/or unknown sources of attempts to access the vehicle gateway ECU can be reported to the central facility. In addition, the data 538 can be the data collected during a target ECU task. An additional diagnosis report 540 can be a report that is generated when the gateway ECU and/or one of the lower ECUs has executed a predefined diagnosis program and been unable to identify a root cause.

Figure 8:
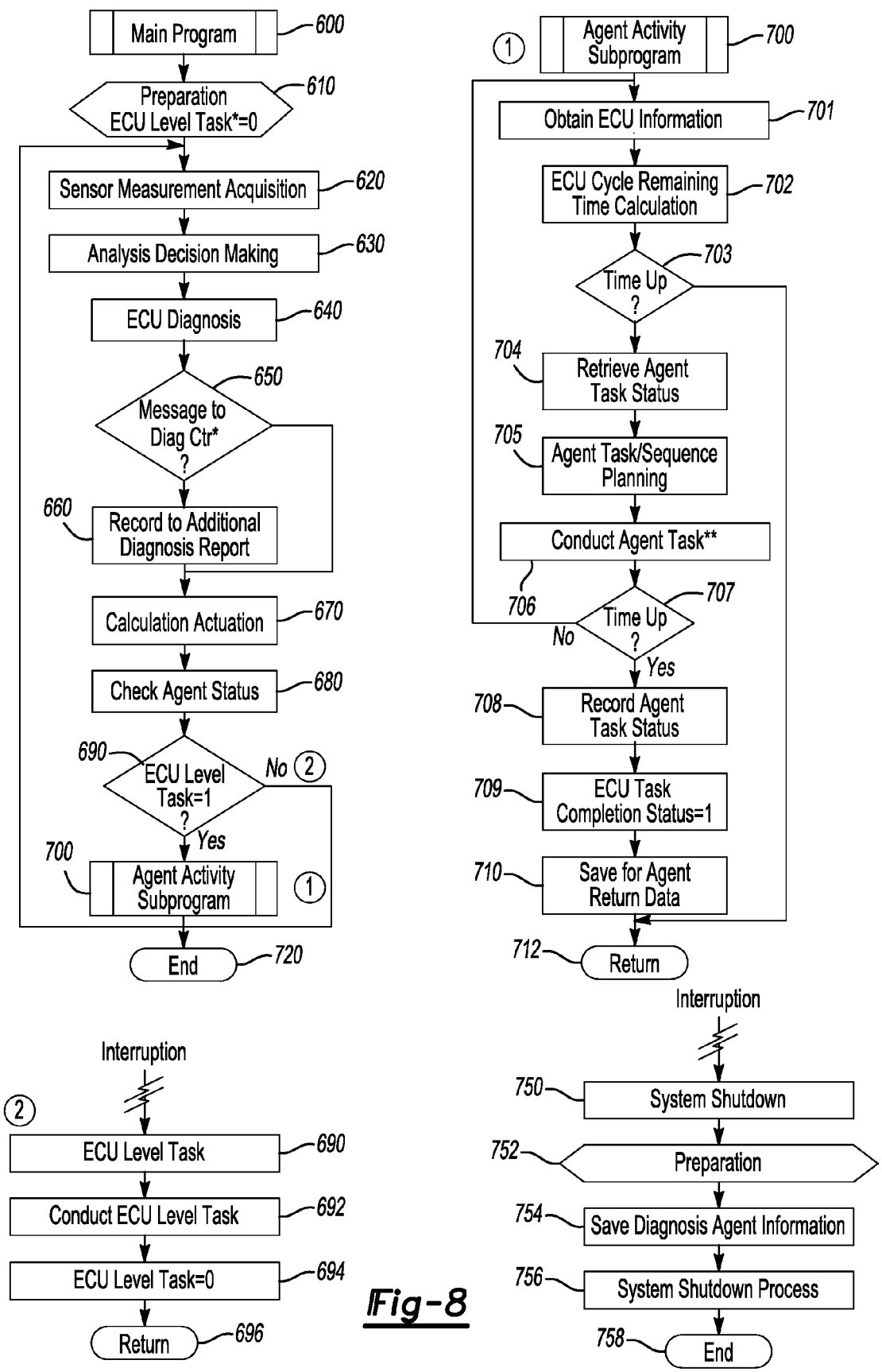
FIG. 8 is a schematic diagram illustrating a flowchart for an electronic control unit with a diagnosis agent.

Turning now to FIG. 8, an example of a flowchart for one of the lower ECUs illustrated in FIG. 6 when a diagnosis agent is included in its operation is shown. The ECU 1 482, ECU 2 484, . . . ECU N 488 as illustrated in FIG. 6 can have a main program 600. The main program 600 can prepare an ECU level task at step 610 with a default value for the task being assigned a value of '0'. Thereafter, sensor measurement acquisition can be conducted at step 620 and analysis and/or decision making performed at step 630.

An ECU diagnosis can occur at step 640 and based thereon whether or not a message should be sent to the central facility or diagnosis center is determined at step 650. If it is determined that a message should be sent to the central facility then an additional diagnosis report can be created at step 660 before proceeding to step 670 where calculation and actuation of actuators under the control of the ECU can occur. In the alternative, if it is deemed that a message is not to be sent to the diagnosis center at step 650, then step 660 is omitted and the process proceeds directly to step 670. Thereafter, the status of the diagnosis agent can be checked at step 680 and whether or not the ECU level task has an assigned value of '1' can be determined at step 690. If the ECU level task has been assigned a value of '1', then an agent activity subprogram (1) can be executed at step 700.

As shown in the figure, the agent activity subprogram 700 can include obtaining ECU information at step 701 and perform an ECU cycle remaining time calculation at step 702. If the ECU cycle time has expended, step 703 directs the subprogram to step 712 where a return to the main program is executed. In the alternative, if the ECU cycle time has not exceeded, then step 703 directs the subprogram to retrieve a DA task status at step 704 and DA task/sequence planning can occur at step 705.

The DA task can be conducted at step 706 followed by another inquiry as to whether the ECU cycle time has expended at step 707. If the cycle time has not expended at step 707, the subprogram can return to obtain ECU information again at step 701. In the alternative if the ECU cycle time has expended, then the diagnosis agent task status can be recorded at step 708. Thereafter, the ECU task completion status is assigned the value of '1' at step 709 and saved for diagnosis agent return data at step 710. Thereafter, the program proceeds to step 712 where it returns to the main program which ends at step 720.

In the event that the ECU level task does not equal 1 at step 690, then an interruption 2 can occur in which the ECU level task is conducted at step 692 and the ECU level task is assigned a value of 0 at step 694. Thereafter, the program returns at step 696 such that a return to sensor measurement acquisition at step 620 can occur.

In the event that there is an interruption such as a system shutdown as shown at 750, preparation for the shutdown can occur at step 752 with the saving of the diagnosis agent information at step 754. Thereafter, the system shutdown process can occur at step 756 followed by an ending of the program at step 758.

Figure 9:
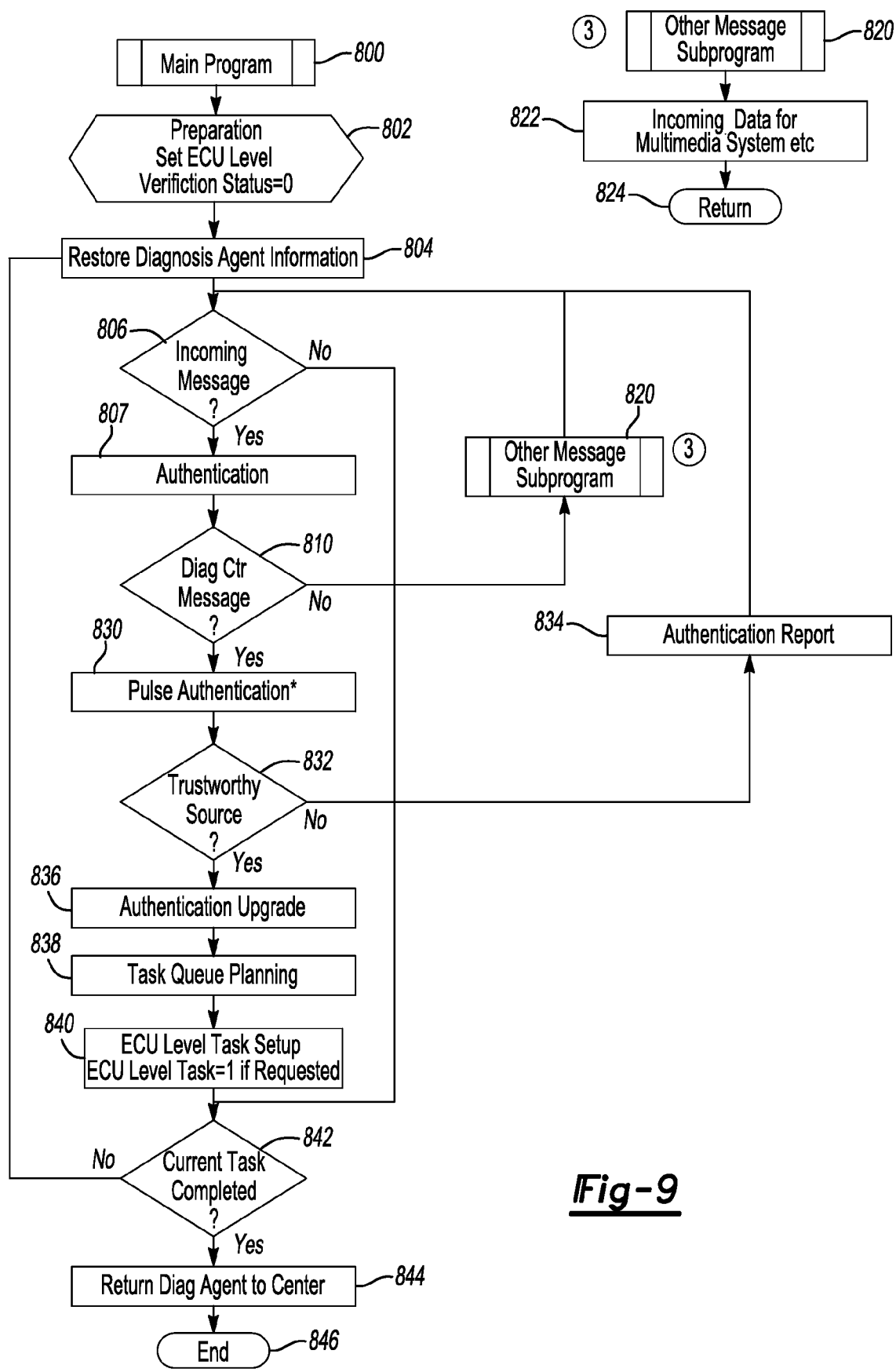
FIG. 9 is a schematic diagram illustrating the flow of a gateway electronic control unit with a diagnosis agent.

Turning now to FIG. 9, a flowchart illustrating a possible flow of steps for the gateway ECU 470 shown in FIG. 6 is provided. For the gateway ECU 470, there can be a main program 800 in which preparation to run the program and set the ECU level verification status at 0 can occur at step 802. At step 804, restoration of diagnosis agent information can occur with an inquiry as to an incoming message occurring at step 806. If an incoming message is detected at step 806 then authentication of the message can occur at step 807. In the alternative, if an incoming message is not detected at step 806 then the program can bypass subsequent steps and proceed down to step 842 where it is determined whether the current task was completed.

Returning to the scenario where an incoming message has been received and authentication has been verified at step 807, it can be determined whether or not a message from the central facility or diagnosis center has been received at step 810. If the message is not from the central facility then another message subprogram can be executed at step 820, the other message program including obtaining access to incoming data from other systems such as a multimedia system, etc. at step 822. Thereafter, the other message subprogram returns at step 824 to step 806 in which the main program 800 inquires whether or not there is an incoming message.

In the alternative, if the message is from the central facility then a pulse authentication can occur at step 830 and an inquiry as to whether the message is from a trustworthy source can occur at step 832. If it is determined that the message is not from a trustworthy source at step 832, an authentication report can be generated at step 834. In the alternative, an authentication upgrade can occur at step 836 followed by a task queue planning at step 838. The task queue planning can include rearranging a task sequence based on the priority of the tasks to be completed with same priority tasks executed on a first-come-first-serve basis. Thereafter, an ECU level task setup can occur at step 840 with the ECU level task assigned the value of '1' if requested. If the current task is determined to be completed at step 842, then the main program 800 can return the diagnosis agent to the central facility at step 844 and the program ends at 846. In the alternative if it is determined that a current task is not completed at step 842, then the program can return to step 804.

In this manner, a diagnosis architecture and/or more effective/efficient algorithm that provides a new and/or upgraded diagnostic capability after a plant has been introduced into the market, placed into service, etc., is provided. In addition, the DA and the central facility with the AGA can provide the capability of diagnosing problems that were unknown when the plant was designed and first introduced to the market and be used to effectively/efficiently identify multiple faults and/or single faults that trigger multiple trouble codes among a plurality of subsystems. It is appreciated that the DA can reduce or eliminate the requirement for onboard diagnosis capability for a given plant and thereby reduce the plant's cost and complexity. Likewise, the DA architecture can provide for a simplified system and has no impact on existing vehicle electronic control unit hardware and little or no impact on existing vehicle electronic control unit structure.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A process for diagnosing a problem in a motor vehicle, the vehicle having a plurality of subsystems, each of the plurality of subsystems having one or more components that participate in the operation of the vehicle by performing one or more vehicle operations, each of the plurality of subsystems also having one or more sensors that detect the one or more vehicle operations and transmit data related thereto, the process comprising:

providing a multi-agent network having an adaptive global agent located in a central facility, a vehicle expert agent located in the vehicle and a plurality of subsystem resident agents, each of said plurality of subsystem resident agents assigned to one of the plurality of subsystems of the vehicle;

providing a diagnosis agent operable to be instructed by said adaptive global agent, transmitted to said vehicle expert agent, received by said vehicle expert agent, transmitted by said vehicle expert agent and received by said adaptive global agent;

instructing the diagnosis agent to instruct the vehicle expert agent to perform an unstructured task;

transmitting the diagnosis agent from the central facility to the vehicle expert agent, the vehicle expert agent receiving the diagnosis agent;

instructing the vehicle expert agent to perform the unstructured task and obtain a result, the vehicle expert agent performing the unstructured task and obtaining a result;

reporting the result to the diagnosis agent;

transmitting the diagnosis agent with the result from the vehicle expert agent to the central facility; and analyzing the result from the vehicle expert agent with the adaptive global agent, whereby a problem in the vehicle is diagnosed.

2. The process of claim 1, further comprising re-instructing the diagnosis agent to instruct the vehicle expert agent to perform an additional task and re-transmitting the diagnosis agent back to the vehicle expert agent.

3. The process of claim 1, wherein the diagnosis agent is instructed by the adaptive global agent.

4. The process of claim 1, wherein the diagnosis agent is instructed by an individual at the central facility using a computer interface.

5. The process of claim 1, further comprising determining a problem in the vehicle based on the result transmitted with the diagnosis agent from the vehicle expert agent to the central facility.

6. The process of claim 1, wherein the result is in the form of data from one of the sensors of the vehicle.

7. The process of claim 1, wherein the result is in the form of a fault code assigned to one of the components of the vehicle.

8. The process of claim 1, wherein the result is in the form of a diagnostic analysis performed by said vehicle expert agent on at least one of the plurality of subsystems of the vehicle.

9. The process of claim 1, wherein the diagnosis agent instructed with an unstructured task is transmitted to the motor vehicle after the motor vehicle has been introduced into the market.

10. The process of claim 1 wherein the diagnosis agent instructed with an unstructured task is transmitted to the motor vehicle after the motor vehicle has been sold to a customer.

* * * * *